No. 859,687. PATENTED JULY 9, 1907.
F. OBERBECK & C. T. TAYLOR.
COOKING STOVE.
APPLICATION FILED SEPT. 21, 1906.
2 SHEETS—SHEET 2.
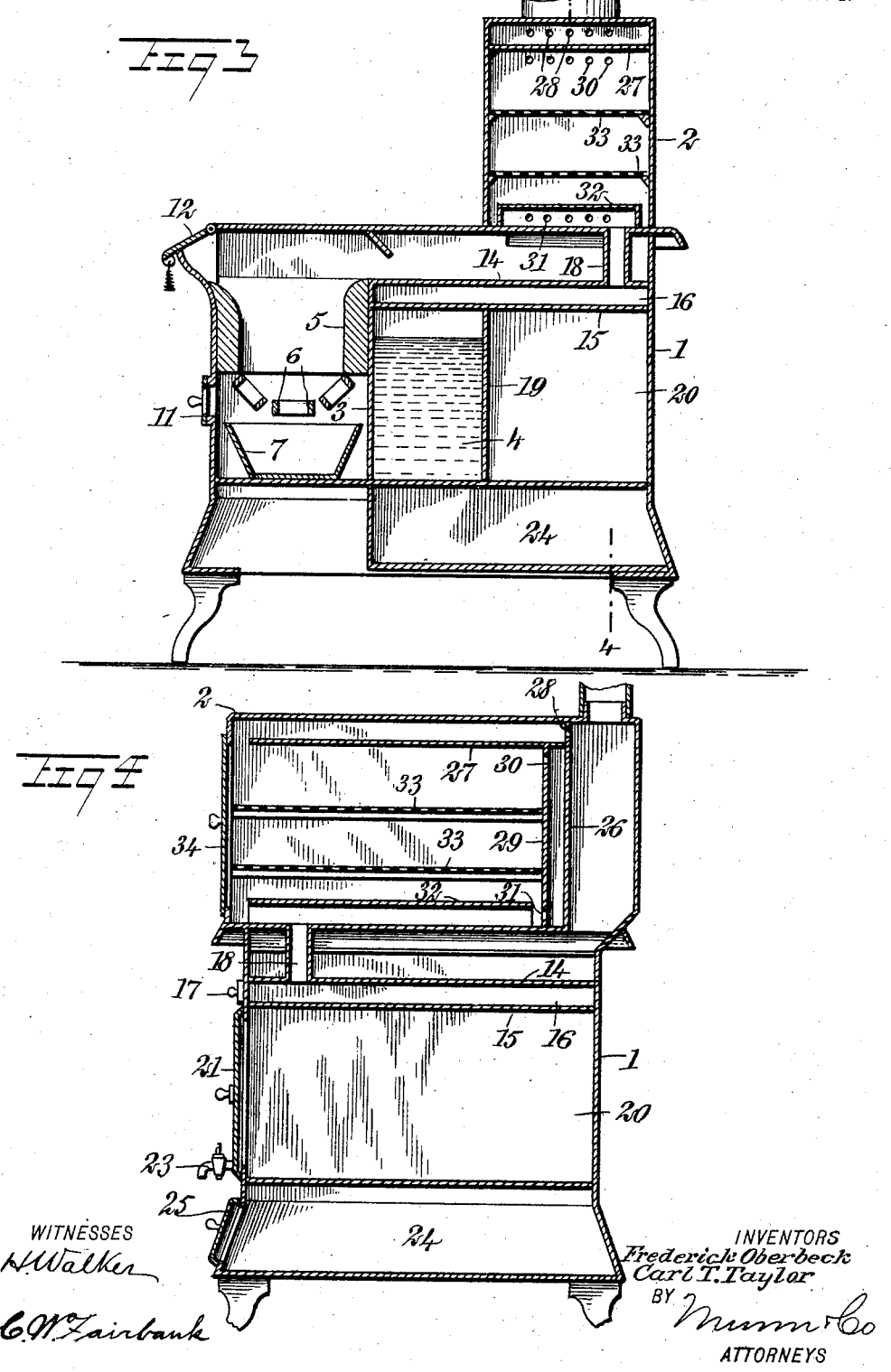
WITNESSES
INVENTORS
Frederick Oberbeck
Carl T. Taylor
BY
Munn & Co
ATTORNEYS

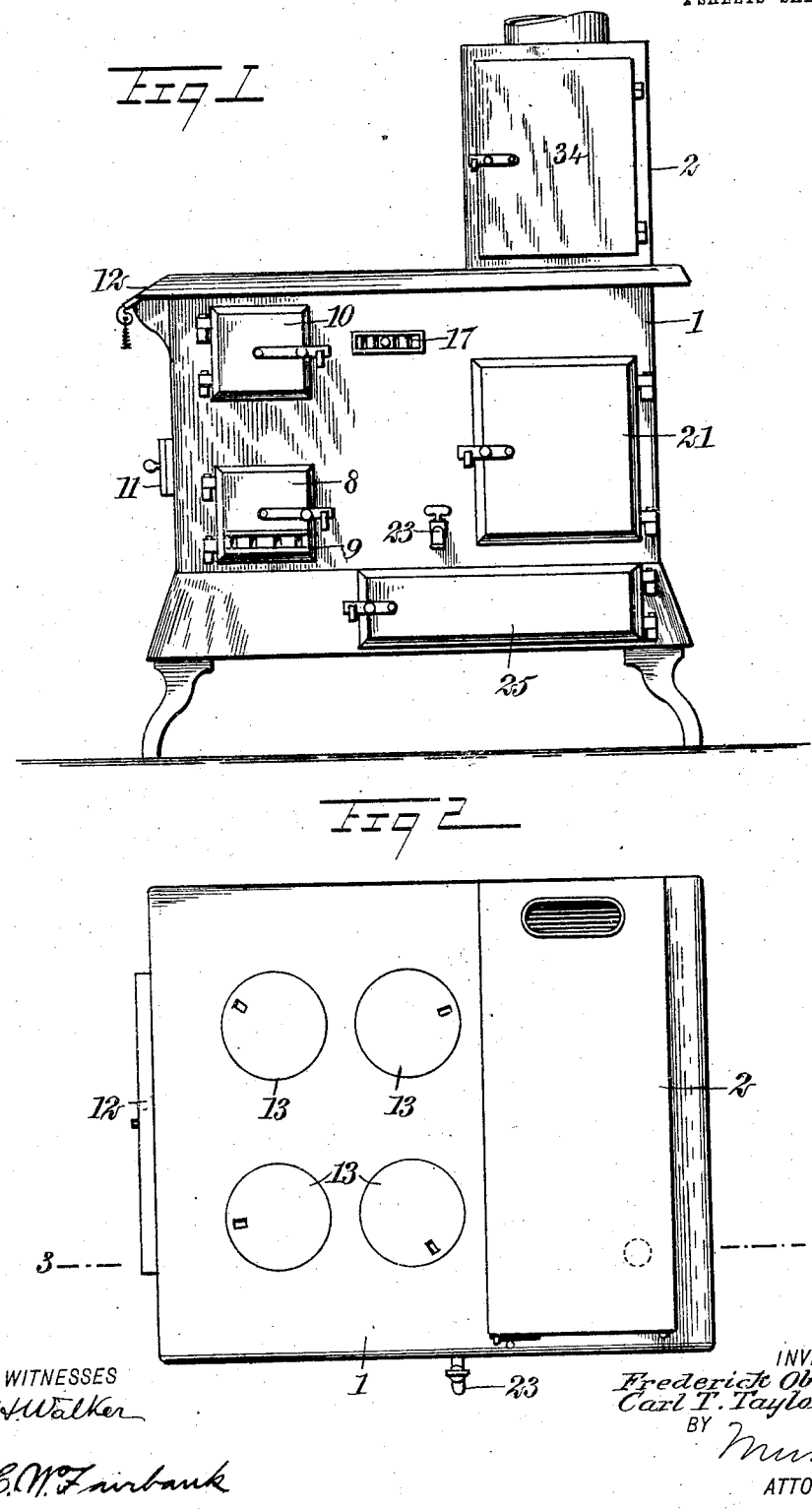

UNITED STATES PATENT OFFICE.

FREDERICK OBERBECK, OF NEW ATHENS, AND CARL TRUE TAYLOR, OF MOUNT STERLING, ILLINOIS.

COOKING-STOVE.

No. 859,687.  Specification of Letters Patent.  Patented July 9, 1907.

Application filed September 21, 1906. Serial No. 335,589.

*To all whom it may concern:*

Be it known that we, FREDERICK OBERBECK, a resident of New Athens, in the county of St. Clair and State of Illinois, and CARL TRUE TAYLOR, a resident of Mount Sterling, in the county of Brown and State of Illinois, and both citizens of the United States, have invented a new and Improved Cooking-Stove, of which the following is a full, clear, and exact description.

This invention relates to a new and improved cooking stove, and has for its object to provide a much simpler and more economically operating stove than any heretofore used.

In our improved cooking stove, as hereinafter described, fresh heated air is admitted to the oven, causing the evaporation to take place faster and thereby removing the moisture from the material being cooked and causing such material, particularly bread, to bake much quicker. The fresh outside air is admitted to a special heating chamber, wherein it is heated to a very high temperature and then delivered to the oven and caused to circulate therethrough to take up the moisture and heat the food, the moisture-laden air carrying the odors being caused to escape up the chimney rather than into the room. The fire passes over the entire heating chamber and comes in contact with a very large heating surface, so that the air is very quickly heated and a rapid circulation thereof is effected. The oven is also heated by the contact of the hot flames with certain of the walls, so that baking can be effected even though the air circulation is entirely shut off. The oven being located at the rear end of the stove, the front portion thereof may be used for ordinary cooking purposes without being interfered with or interfering in any way with the operation of the oven.

A further object of our invention is to reduce the number of flues and dampers existing in the common form of cooking stoves, so that there are no recesses or passages to become clogged up with soot and ashes and interfere with the draft. The small number of dampers employed renders the stove very simple, and the improved means for providing air circulation through the oven results in more thoroughly, evenly, quickly and healthfully cooking the food.

Reference is to be had to the accompanying drawings forming a part of this specification, in which similar characters of reference indicate corresponding parts in all the figures, in which Figure 1 is a side elevation of our improved cooking stove; Fig. 2 is a plan view thereof; Fig. 3 is a vertical section on the line 3—3 of Fig. 2; and Fig. 4 is a vertical section on the line 4—4 of Fig. 3.

Our improved cooking stove comprises a rectangular body portion 1, having an oven 2 located thereon adjacent the rear end, and having the main body portion of the stove sub-divided by a plurality of partitions to form the various compartments. A vertical partition 3 extends from the lower portion of the stove to a point adjacent the top thereof, and serves to separate the fire-box from a hot water reservoir 4. The fire-box is provided with the usual lining 5, surrounding its sides, and the usual grate 6, adapted to support the fire. Beneath the grate 6 is an ash pan 7, which may be ejected through a door 8, having a small damper 9 at the lower portion thereof, and the wall of the stove above the door 8 is provided with a second door 10, whereby fuel may be inserted endwise into the stove. The end of the stove is provided with a damper 11, adjacent the grate, and a small door 12 at the upper portion of the stove, whereby fuel may be inserted in the fire-box from above without removing any of the lids 13 from the top.

Extending from the upper end of the partition 3 to the end of the stove opposite to the fire-box, is a partition 14, substantially parallel to the top of the stove and forming a flue or passage for the hot gases or flames on their way to the chimney. A short distance below this partition 14 is a second partition 15, substantially parallel thereto and forming with the partition 14 and the side walls of the stove, an air chamber or compartment 16 in which the air is heated to a very high temperature before it is admitted to the oven. The side of the stove is provided with a small damper 17, controlling the admission of air to this chamber, and the partition 14 is provided with an upwardly-extending tube 18, through which the heated air passes on its way to the oven. Beneath the chamber 16 is a substantially vertical partition 19 separating the space below into the reservoir 4 and a warming compartment 20, admission to which is gained by a door 21 in the side of the stove. A suitable faucet 23 may be provided for drawing hot water from the reservoir 4. If desired, a second warming compartment 24 may be provided, which extends beneath the reservoir 4 and warming compartment 20, and admission to this may be gained through a suitable door 25.

Located above the main stove body and adjacent the rear end thereof, is our improved oven having communication with the air heating chamber 16 through the pipe 18, and also having a flue for the passage of the smoke and hot gases from the fire. This oven is substantially rectangular in cross section, and is provided with a partition 26 sub-dividing the oven proper from the flue for the smoke, which flue communicates with the space above the partition 14 by means of a suitable opening, as indicated in Fig. 4. The oven is provided with a partition 27, substantially parallel to the top of the oven and connected with the partition 26 at one end but free from the wall of the oven at the opposite end. The partition 26 is provided with one or more perforations 28 above the partition 27, and a second vertical partition 29 extends parallel to the partition 26, and is provided with perforations 30 and 31, adjacent its upper and lower extremities, respectively. A false bottom 32 is provided within the oven substantially parallel to the top of the stove body, and supported above the same by downwardly-extending flanges or side walls, as shown in Fig. 3. Any number of shelves 33 may be provided for supporting the material to be baked in the oven, and access to the oven is gained through a suitable door 34.

In the operation of our improved cooking stove, the flame and hot gases from the fire-box pass beneath the top of the stove and are directed against the partition 14 by a suitable deflector, shown in Fig. 3. Upon reaching the back end of the stove they pass through into the flue in the oven and thence to the chimney. The oven is heated by the passage of the hot gases beneath the bottom thereof and up through the flue. Fresh air is admitted through the damper 17 and heated to a very high temperature in the air-heating chamber 16. It then passes through the tube 18 to the oven where it strikes the false bottom and is delivered into the oven proper at the two ends. A portion of this heated air passes through the perforations 31 and is still further heated by contact with the flue, and is then delivered through the perforations 30 directly against the material being baked. All of the air, whether entering the oven proper through the perforations 30 or whether passing around the opposite end of the false bottom 32, can only escape by passing around the end of the partition 27 and thence through the perforations 28 to the flue. In escaping from the oven it carries with it, all of the moisture which has been evaporated from the material being cooked and all of the odors rising within the oven. If it is not desired to circulate air through the oven during the cooking operation, the damper 17 may be closed and the cooking effected by the contact of the hot gases with the bottom or under wall of the oven, in which case an automatic circulation of air within the oven would be effected through the perforations 30 and 31.

Having thus described our invention, we claim as new and desire to secure by Letters Patent:

1. A cooking stove, comprising a body portion, a fire-box located adjacent one end thereof, a substantially vertical partition separating said fire-box from the remainder of the body portion, two substantially horizontal partitions connected to the upper end of the first mentioned partition, a damper for controlling the admission of fresh air to the space between the said partitions, an oven located above the body portion, a tube connecting said space between the partitions with said oven, a passage for the products of combustion adjacent one end of the oven, and baffles within said oven for deflecting the fresh heated air delivered thereto, said oven being provided with a perforation whereby the heated air may escape from the oven to the passage for the products of combustion.

2. A cooking stove, comprising a rectangular body portion, a fire box located adjacent to one end thereof, a partition extending from said fire box to the opposite end of the body portion, a second partition below said first-mentioned partition and forming therewith an air heating chamber, and forming with the top of the stove a conduit for the gases of combustion, a damper in the side wall of the body portion for admitting fresh air to the air heating chamber, an oven supported on the body portion, a conduit for delivering the heated air to the interior of said oven, baffles within said oven for deflecting the fresh heated air delivered thereto, and a second conduit extending through said oven for conducting the gases of combustion.

3. A cooking stove, comprising a rectangular body portion, a substantially vertical partition separating the body portion into two compartments, a fire box in one of said compartments, a partition connecting the top of said first-mentioned partition with the opposite end of the body portion, a second partition substantially parallel to the first-mentioned partition and spaced a short distance therefrom and forming therewith an air heating chamber, both of said partitions extending the entire width of the body portion, a damper in one side wall of the body portion adjacent the top thereof and serving to control the admission of fresh air to said air heating chamber, an oven supported on the body portion, a conduit connecting said air heating chamber with the interior of said oven, means within said oven for deflecting said heated air, a conduit for the products of combustion extending through said oven and having an opening whereby the heated air of the oven may escape into said conduit.

4. A cooking stove, comprising a body portion having a fire box, an oven supported upon said body portion, a conduit within said body portion and comprising an air heating chamber, a conduit connecting said air heating chamber with the interior of said oven, a conduit for the products of combustion extending through said oven adjacent one end thereof, a baffle plate within said oven and adjacent the delivery end of the air conduit, a plurality of perforated shelves within said oven, and a baffle plate within said oven adjacent the top thereof and extending from said conduit for the products of combustion to a point adjacent the opposite end of the oven, said conduit being provided with openings communicating with the oven above said last-mentioned baffle plate.

In testimony whereof I have signed my name to this specification in the presence of two subscribing witnesses.

FREDERICK OBERBECK.

Witnesses to the signature of Frederick Oberbeck:
WM. EDW. SCHERER,
ANDREW EMGE.

In testimony whereof I have signed my name to this specification in the presence of two subscribing witnesses.

CARL TRUE TAYLOR.

Witnesses to the signature of Carl True Taylor:
LEON ORR,
FRANK ORR.